United States Patent [19]
Basiulis

[11] 3,968,787
[45] July 13, 1976

[54] CONTROLLED VAPOR CHAMBER COOKING DEVICE

[75] Inventor: Algerd Basiulis, Redondo Beach, Calif.

[73] Assignee: Hughes Aircraft Company, Culver City, Calif.

[22] Filed: Mar. 16, 1973

[21] Appl. No.: 342,022

[52] U.S. Cl. .................. 126/390; 165/105; 165/134; 236/99 R; 432/91
[51] Int. Cl.² ........................................ A47J 37/00
[58] Field of Search ............ 165/105, 134; 126/390; 432/91; 219/326, 430, 439, 462; 137/540, 68–71; 236/99

[56] References Cited
UNITED STATES PATENTS

| | | | |
|---|---|---|---|
| 688,755 | 12/1901 | Traxel | 137/540 |
| 1,987,119 | 1/1935 | Long | 165/105 X |
| 2,182,315 | 12/1939 | Hart | 236/99 B X |
| 2,820,134 | 1/1958 | Kobayashi | 165/105 X |
| 2,955,184 | 10/1960 | Grindrod | 219/462 X |
| 3,237,608 | 3/1966 | Brandl | 165/105 X |
| 3,327,772 | 6/1967 | Kodaira | 165/105 X |
| 3,554,183 | 1/1971 | Grover et al. | 165/105 X |
| 3,603,767 | 9/1971 | Scicchitano | 165/105 X |
| 3,613,778 | 10/1971 | Feldman, Jr. | 165/105 |
| 3,651,861 | 3/1972 | Deuring | 165/105 X |
| 3,712,053 | 1/1973 | Kofink | 165/105 X |
| 3,728,518 | 4/1973 | Kodaira | 165/105 X |
| 3,759,443 | 9/1973 | Freggins | 165/105 X |
| 3,773,019 | 11/1973 | Hapgood | 165/105 X |

FOREIGN PATENTS OR APPLICATIONS

| | | | |
|---|---|---|---|
| 500,133 | 2/1939 | United Kingdom | 165/105 |

*Primary Examiner*—Albert W. Davis, Jr.
*Attorney, Agent, or Firm*—Paul H. Ware; W. H. MacAllister

[57] ABSTRACT

A vapor chamber cooking device is disclosed wherein a capillary wick is disposed along the bottom surface of a sealed vapor chamber, the top wall of which provides a cooking surface. A plurality of internal structural support members having vapor pressure equalization holes are disposed between the wick and the upper surface of the chamber and secured to the upper chamber surface. A quantity of volatile working fluid is disposed in the chamber sufficient to saturate the wick when in a liquid state. An arrangement is provided for heating the chamber to vaporize working fluid contained therein, and a feedback control arrangement responsive to the vapor pressure within the chamber controls the heating arrangement to maintain the chamber vapor pressure within a predetermined range. Additional arrangements may be provided to respond to predetermined conditions of overpressure within the chamber to relieve the overpressure conditions.

4 Claims, 4 Drawing Figures

CONTROLLED VAPOR CHAMBER COOKING DEVICE

BACKGROUND OF THE INVENTION

1. Field of the Invention

This invention relates generally to heat transfer devices and more particularly to vapor chamber cooking devices providing an isothermal cooking surface under changing conditions of thermal load and which is reliably protected from overpressure conditions.

2. Description of the Prior Art

Among a number of devices which have been employed for cooking is the directly heated griddle in which heat is applied directly to the underside of a flat metal cooking surface. Such griddles may vary in surface area from the small ones used in the home to the very large ones used in professional food preparation establishments such as restaurants, hotels and other mass producers of cooked foods. In most applications, the only temperature control afforded is through adjustment of the source of heat by the operator of the griddle. Such an adjustment requires discovery of an undesired temperature condition on the surface of the griddle, a trial adjustment of the heat source, an observation of how well the trial adjustment succeeds and, usually, a repetition of the whole process until the desired temperature is obtained. Moreover, the temperature of the cooking surface of a directly heated griddle is dependent upon the thermal load and may become highly nonuniform as a result of significant changes in thermal load conditions. For example, the griddle may be in equilibrium at the temperature required to prepare two hamburgers; however, the addition of five more frozen hamburgers will upset the temperature equilibrium to such an extent that it becomes necessary to apply more source heat for the purpose of offsetting the changed thermal load conditions. In the application of source heat to the griddle, hot spots are developed due to uneven distribution of the source heat and inhomogeneous thermal conductivity of the flat metal surface itself. Thus, directly heated devices such as griddles have poor temperature regulation and control, require a great amount of monitoring, and develop unpredictable hot spots as a result of changed conditions of thermal load.

Another cooking device commonly employed by restaurants, cafeterias, hotels, and other institutions where mass processing of food is required is a steam table. This device in its usual form comprises an elongated chamber having inserts provided in its top surface for the insertion of food-containing vessels especially made to fit into these inserts. The food containers receive heat carried by circulating steam and transmitted through the walls of the inserts. The temperature of the circulating steam is usually controlled by controlling of the pressure at which the steam is generated. (Steam which is generated at elevated temperatures and pressures is called super-heated steam.) The higher the pressures employed, the greater the danger of high pressure leaks and explosions with attendant danger to operating personnel. The circulating steam is usually transmitted to the steam table from a steam generator by means of high pressure hoses and fittings. Operation and maintenance of steam tables require specially trained personnel and specialized equipment, and maintenance and repair of these units are expensive and time-consuming. Moreover, since temperatures above boiling (212°F) may be maintained only through the use of greater than atmospheric pressures, the steam table finds primary application in cooking at temperatures of around 212°F or only slightly higher and in the maintenance of quantities of food at such temperatures for long periods of time.

Another cooking device commonly used in restaurants, hotels and other mass food processing establishments is the double boiler which consists of a vented chamber partly filled with a liquid working fluid, usually water. Application of heat to the double boiler causes its working fluid to boil and become vaporized at atmospheric pressure. The vaporized working fluid condenses on the inner working surfaces of the chamber causing its temperature to rise. Since the chamber is usually vented to the atmosphere, only one operating temperature may be maintained, that of the boiling point of the working fluid at the prevailing pressure. Thus, no temperature control is provided. Moreover, working fluid must be frequently added to the double boiler to replace the constant loss of fluid vapor to the atmosphere.

A cooking device which operates on the heat pipe principle is disclosed in U.S. Pat. No. 3,603,767 to Edward A. Scicchitano. This device consists of a fry pan having sealed evacuated reservoir disposed beneath the fry pan surface. A working fluid is disposed in the reservoir and, upon heating, forms vapor which condenses on the underside of the fry pan working surface and thereby heats the surface. The condensed vapor is drained from the underside of the surface by means of a capillary structure disposed in the reservoir. Heat control is afforded by means of a conventional thermostat control which plugs into the pan and thereby senses the pan temperature. A disadvantage of such an arrangement is that it senses a localized pan temperature. As a result, the application of cold food to the pan in the vicinity of the thermostat creates an apparent demand for additional applied heat which in turn causes overheating of the unused pan surface area away from the thermostat. Thus, the temperature control afford is relatively slow and inaccurate and nonuniform heating of the pan surface may result as cold food is placed on the pan. Moreover, overheating and overpressure form an ever-present danger which may lead to rupture of the device and attendant harm to the operator.

SUMMARY OF THE INVENTION

It is an object of the present invention to provide a cooking device exhibiting improved temperature regulation and control.

Another object of the invention is to provide a cooking device having an essentially isothermal cooking surface substantially free from hot spots.

It is a further object of the invention to provide a cooking device which exhibits fast response to changing conditions of thermal load.

It is a still further object of the invention to provide a vapor chamber cooking device which incorporates substantially fail-safe protective arrangements to prevent catastrophic failure of the device under conditions of overheating and/or overpressure.

A vapor chamber cooking device according to the invention includes a housing defining a sealed vapor chamber and having an extended top wall for providing a cooking surface. A capillary wick is disposed along the bottom surface of the chamber, and a plurality of internal structural support members are disposed between the wick and the upper surface of the chamber. The support members are secured to the upper chamber surface and define a plurality of vapor pressure equilization holes. A quantity of volatile working fluid is disposed in the chamber sufficient to saturate the wick when in a liquid state. An arrangement is provided for heating the chamber to vaporize working fluid contained therein. A control arrangement responsive to the vapor pressure within the chamber controls the heating arrangement to maintain the chamber vapor pressure within a predetermined range. A further arrangement responsive to a predetermined condition of overpressure within the chamber is provided to relieve the overpressure condition.

Additional objects, advantages and characteristic features of the present invention will become readily apparent from the following detailed description of preferred embodiments of the invention when considered in conjunction with the accompanying drawings.

DETAILED DESCRIPTION

Figure 1:
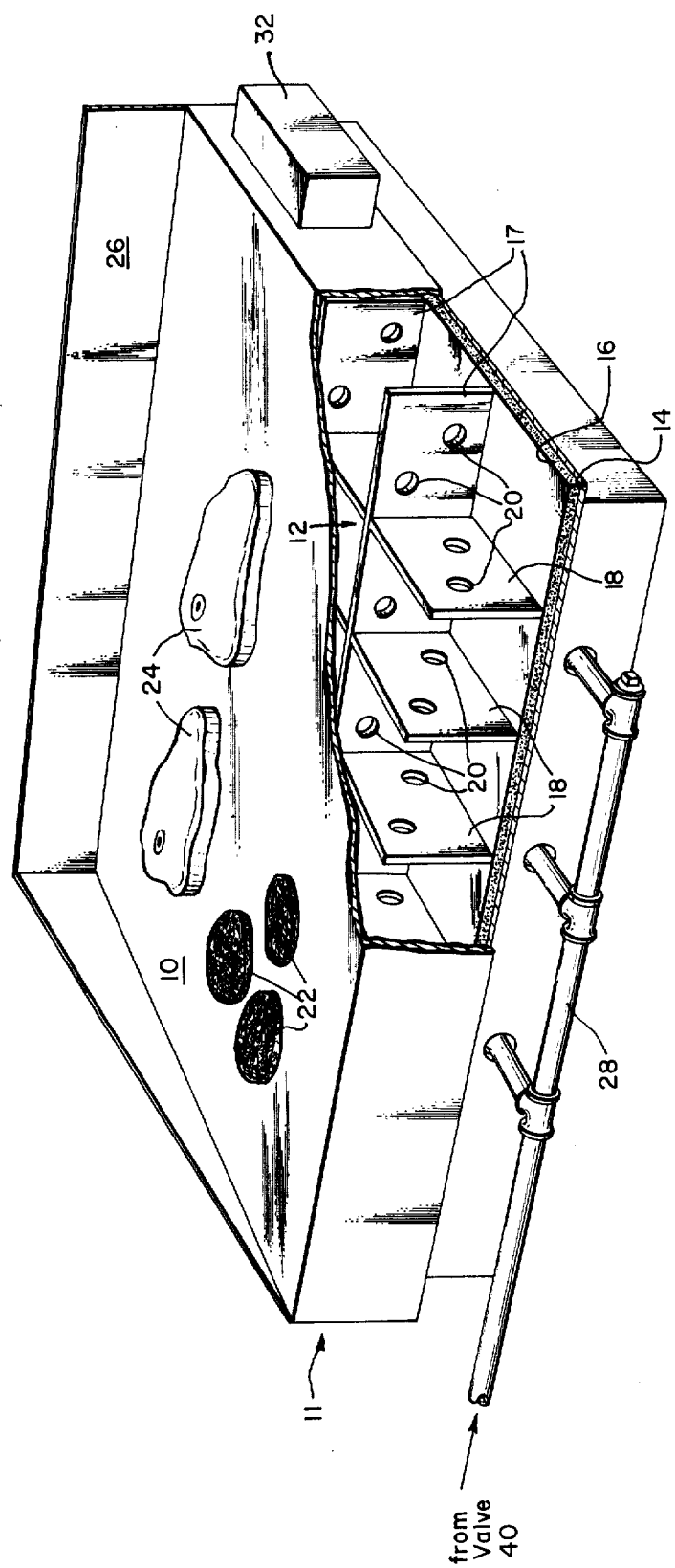
FIG. 1 is a simplified idealized perspective view illustrating a vapor chamber cooking device in accordance with the invention and with a cutaway portion illustrating details of internal construction.

Referring to FIG. 1 with greater particularity, a cooking device in accordance with the invention may be seen to comprise a housing 11 which defines a sealed vapor chamber 12. The top wall of the housing 11 provides a cooking surface 10 which is shown with food such as hamburgers 22 and steaks 24 being cooked thereon. A capillary wick 16 is disposed along the bottom wall 14 of the vapor chamber 12. A plurality of longitudinally extending internal structural support members 17 and a plurality of transverse internal structural support members 18 affixed to one another to form a grid-like support arrangement are disposed in the chamber 12 between the wick 16 and the upper surface of the chamber 12 and are secured to the chamber upper surface. A plurality of holes 20 are provided in the support members 17 and 18 to afford pressure equilization throughout the chamber 12. A grease spatter shield 26 is provided at the rear and side edges of the cooking surface 10.

A volatile working fluid is disposed in the vapor chamber 12 in an amouut sufficient to saturate the wick 16. A list of exemplary working fluids which may be employed along with their approximate operating temperature ranges is given below.

| WORKING FLUID | APPROXIMATE OPERATING TEMPERATURE RANGE °F. |
|---|---|
| Mercury | 390 – 935 |
| Dowtherm A | 300 – 650 |
| Dowtherm E | 250 – 480 |
| GC 43 | 250 – 425 |
| Dowcorning 200 | 212 – 390 |
| Water | 167 – 300 |
| Freon 13 | 68 – 167 |

Since desirable operating temperatures for vapor chamber cooking devices usually range from about 200°F to about 450°F, Dowtherm A is a preferred working fluid since its boiling point is well above 450°F and, therefore, the vapor pressure in the chamber 12 will always be at less than atmospheric pressure. Specifically, the vapor pressure of Dowtherm A at 450°F is 8.25 psi and does not reach atmospheric pressure until the temperature reaches 496°F.

The wick 16 to be used should not only be of a material that does not react chemically with the working fluid but should also be capable of containing enough of the working fluid to preclude local dryout. Examples of suitable wick materials include quartz fiber cloth and woven metal screen. Preferably, the wick 16 is constructed of the same material as the housing 11. Stainless steel appears to be an attractive metal from which to fabricate the wick 16, the housing 11 and the internal support members 17 and 18. In addition to providing structural integrity and rigidity, the internal structural supports 17 and 18 provide a working fluid return flow path to the wick 16.

The bottom, or evaporator, wall 14 of the housing 11 should be as thin as structural limitations will permit in order to enhance thermal conductivity. The minimum thickness of wall 14 is dependent upon the spacing of the internal support members 17 and 18, and it has been found that a stainless steel evaporator wall only 1/16 inch thick may be employed for support spacing of 4 inches for the longitudinal members 17 and 2 inches for the transverse members 18. The housing top wall which provides cooking surface 12 should be somewhat thicker than the bottom wall 14 and may be of ⅛ inch thick stainless steel, for example.

In order to evaporate working fluid from the wick 16, an arrangement is provided for applying heat to the bottom wall 14 of the chamber 12. Although various forms of heating arrangements are suitable, in the exemplary embodiment illustrated herein a fuel supply line 28 is shown for supplying a combustible fuel, such as natural gas, to a plurality of burners (not shown) disposed beneath the bottom wall 14 of the chamber 12.

Figure 2:
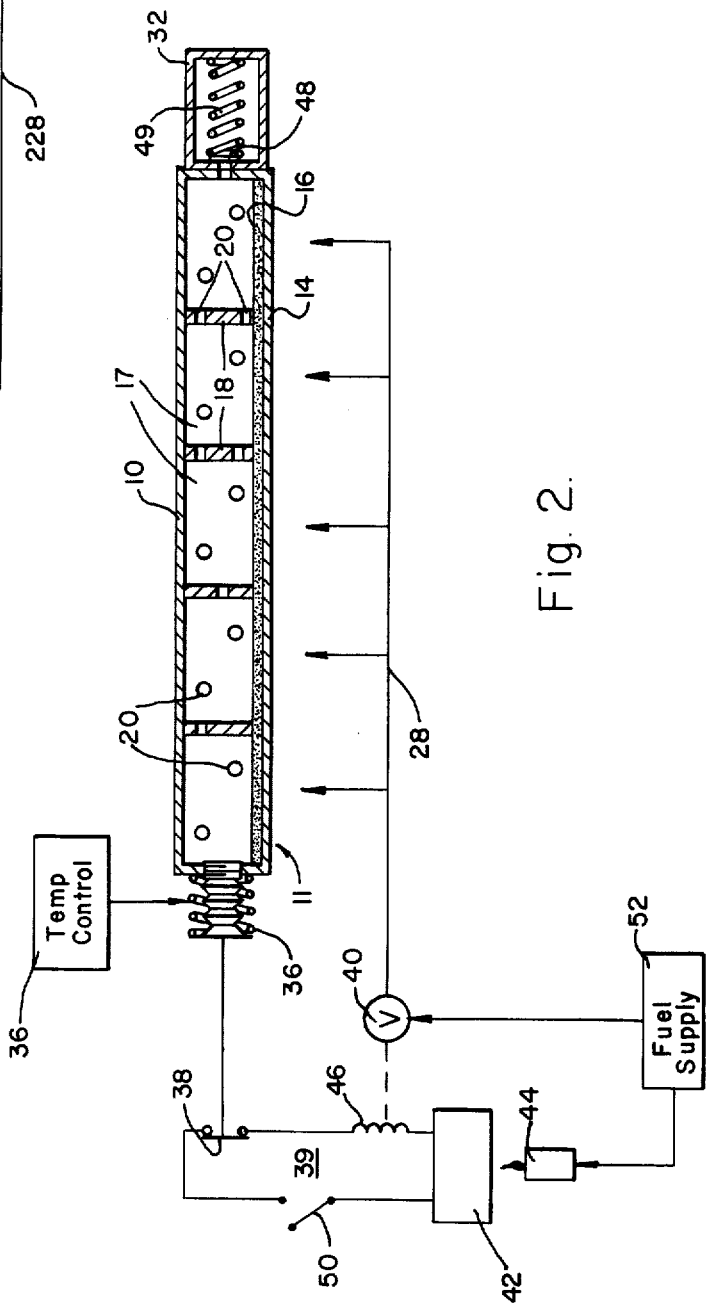
FIG. 2 is a schematic diagram illustrating a heating and control arrangement for the vapor chamber cooking device of FIG. 1 (which is shown in cross-section) in accordance with one embodiment of the invention.

Referring to FIG. 2, a feedback control arrangement is shown to control the vapor pressure within the chamber 12 and thereby achieve a desired cooking temperature on the cooking surface 10. In the exemplary embodiment illustrated in FIG. 2, a pressure actuatable device, illustrated as a spring-loaded bellows 34, is operably coupled between the vapor chamber 12 and a normally closed mechanically operated switch 38 coupled in an electrical circuit 39. A temperature control device 36 is coupled to the spring-loaded bellows 34, to controllably adjust the spring tension for example, in order to set the cooking temperature to a desired value. Electrical circuit 39 includes the series connection of switch 38, a master control switch 50, a thermocouple-controlled voltage source 42, usually providing a voltage of the order of a few millivolts, and a solenoid coil 46. Solenoid coil 46 is operatively arranged to open and close a valve 40 disposed between fuel supply 52 and the fuel supply line 28. A pilot burner 44, which is also fed from the fuel supply 52, is positioned to actuate thermocouple-controlled voltage source 42 as well as the main burners beneath the vapor chamber 12.

In the operaton of the vapor chamber device of FIG. 2, when it is desired to commence a cooking operation the master control switch 50 is closed to complete electrical circuit 39. The resultant flow of current from voltage source 42 through solenoid coil 46 causes valve 40 to open and thereby admit gas from supply 52 to fuel supply line 28. Ignition of the burners beneath the vapor chamber 12 is then afforded by means of pilot burner 44, resulting in heating of the chamber evaporator wall 14.

Heat applied to the evaporator wall 14 causes evaporation of the working fluid from capillary wick 16. Vapor thus created migrates to the upper region of the chamber 12 and condenses on the top wall of chamber 12. Upon condensing, the working vapor gives up its latent heat of vaporizaton, thus raising the temperature of the cooking surface 10. The condensate thus formed returns to wick 16 under the action of gravity.

As heat continues to be applied to the evaporator wall 14, the ambient vapor pressure within the chamber 12 rises and eventually becomes of sufficient magnitude to cause expansion of spring-loaded bellows 34. Upon sufficient expansion of the bellows 34, mechanically controlled switch 38 is opened, causing solenoid coil 46 to become de-energized and thereby closing fuel supply valve 40. The closing of fuel supply valve 40 stops the flow of fuel in fuel supply line 28, thereby discontinuing the application of heat to evaporator wall 14. This results in a lowering of the vapor pressure within the chamber 12 and the subsequent contraction of sping-loaded bellows 34. After the bellows 34 has contracted sufficiently, switch 38 is closed and the afore-described operation is repeated to again apply heat to the evaporator wall 14 and resume evaporation of working fluid from wick 16. The vapor pressure within the chamber 12 is thus maintained within a predetermined range, and as a result the temperature of the cooking surface 10 is maintained at the desired value as preset by temperature control 36. The relationship between the pressure P and the temperature T (in degrees Kelvin) of the vapor within the chamber 12 is given by $$P = \frac{Q}{AV} \ln T + K,$$

where Q is the heat input to the device, A is the surface area of the wick 16, V is the volume of working fluid in the liquid state, and K is an integration constant.

Although the afore-described feedback control loop is designed to turn off the heat supply for the vapor chamber device when the vapor pressure within the chamber 12 reaches a predetermined value (and thereby prevent any overpressure condition from occurring in the chamber 12), further protective arrangements are provided in accordance with the invention to relieve any overpressure conditions which might occur. In one such arrangement, illustrated in FIGS. 1 and 2, an auxiliary chamber 32 is provided in fluid communication with the vapor chamber 12. A valve 48 is disposed in the auxiliary chamber 32 adjacent its opening with the chamber 12 and is normally urged to a closed position by means of a pressure-actuated spring 49. Auxiliary chamber 32 preferably has a volume such that it can contain at least about twice the liquid volume of the vapor chamber working fluid.

When a sufficiently high vapor pressure occurs within the chamber 12, due to a malfunction in the feedback control loop for example, valve 48 is opened against the force of the spring 49, allowing working fluid vapor to enter the auxiliary chamber 32 and reduce the vapor pressure in the chamber 12.

Figure 3:
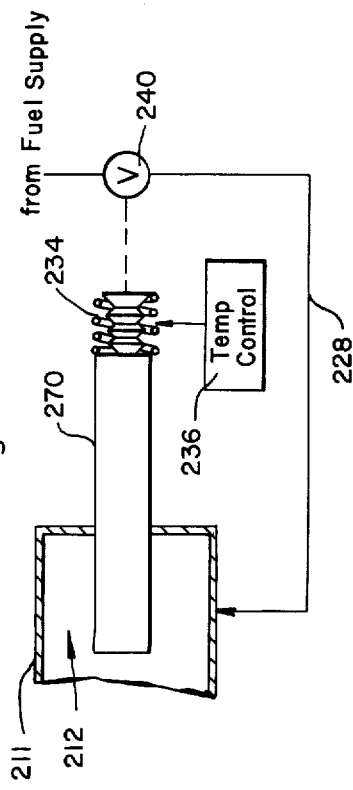
FIG. 3 is a partial schematic diagram showing a protective arrangement for a vapor chamber cooking device in accordance with the invention.

Another protective arrangement for relieving an overpressure condition within the vapor chamber is illustrated in FIG. 3. Components in the arrangement of FIG. 3 which correspond to counterpart components in the device of FIGS. 1 and 2 are designated by the same second and third reference numeral digits as their corresponding components but with the addition of a prefix numeral 1.

In the arrangement of FIG. 3, auxiliary chamber 132 is provided adjacent to vapor chamber 112 and preferably has a volume equal to at least about twice the liquid volume of the working fluid in the chamber 112. A fluid passageway 160 is provided between the vapor chamber 112 and the auxiliary chamber 132, and a pressure-sensitive rupturable disc 148, which may be of stainless steel for example, is disposed in the passageway 160 to normally block the passage of working fluid between the chambers 112 and 132. In the event the pressure within the vapor chamber 112 reaches a predetermined overpressure value, disc 148 ruptures, allowing the escape of working vapor into the auxiliary chamber 132. The working vapor will continue to flow from vapor chamber 112 into auxiliary chamber 132 until there is insufficient fluid remaining in the chamber 112 to operate the unit. It is further pointed out that the rupturable disc protective arrangement of FIG. 3 may be provided either instead of or in addition to the previously described arrangement including auxiliary chamber 32 and spring-loaded valve 48.

Figure 4:
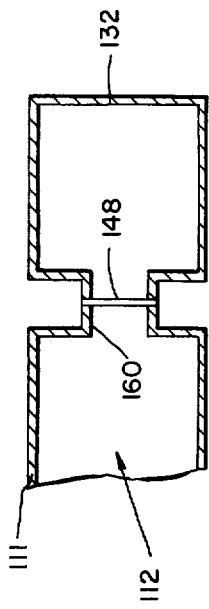
FIG. 4 is a partial schematic diagram illustrating a control arrangement for the cooking device of FIG. 1 according to an alternate embodiment of the invention.

An alternate feedback control arrangement for regulating the pressure (and hence the temperature of the cooking surface) in accordance with a further embodiment of the invention is illustrated in FIG. 4. Components of the embodiment of FIG. 4 which correspond to components in the embodiment of FIGS. 1 and 2 are designated by the same second and third reference numeral digits as their counterpart components in FIGS. 1 and 2 but with the addition of a prefix numeral 2.

In the arrangement shown in FIG. 4, sensing of the vapor pressure within vapor chamber 212 is achieved by means of a high vapor pressure heat pipe 270, the working fluid of which may be water for example, having a portion extending into the vapor chamber 212. Operatively coupled between heat pipe 270 and fuel supply valve 240 is a spring-loaded bellows 234, the spring tension of which may be controllably adjusted by temperature control 236 in order to preset the unit to a desired cooking temperature.

In the operation of the feedback control arrangement of FIG. 4, when heat is applied to the vapor chamber 212 an increase in the vapor pressure within the chamber 212 (which is accompanied by an increase in temperature) causes increased evaporation of the working fluid within the sensing heat pipe 270, thereby increasing the vapor pressure of the working fluid within the heat pipe 270. When the vapor pressure within the heat pipe 270 reaches a predetermined value corresponding to the maximum desired pressure in vapor chamber 212, bellows 234 expands sufficiently to close fuel supply valve 240 and thereby prevent further supply of fuel via supply line 228 to the burners beneath the vapor chamber 212.

A controlled vapor chamber cooking device according to the invention possesses many advantages over prior art cooking devices used by commercial food preparing establishments and restaurants. Reliable temperature stabilization of the entire cooking surface may be obtained and maintained within a comparatively short time. For example, for a vapor chamber cooking device constructed according to FIGS. 1 and 2 and operation at 110,000 BTU per hour, it has been found that the average warm-up time from room temperature to 400°F is about 3.5 minutes. Because of the unique temperature control capabilities of the device, temperature overshoot is negligible, and the cooking surface has been found to be isothermal to within ±2°F (in contrast to temperature deviations of about ±50°F exhibited over the surface of similarly sized commercial solid steel griddles). Moreover, since a vapor chamber cooking device according to the invention operates with a heat control feedback loop which senses the vapor pressure within the chamber, changes in thermal load at a localized area of the cooking surface (such as may be caused by the introduction of a frozen hamburger) have little effect on the feedback control loop because the effect upon the total vapor pressure within the chamber is very small. Thus, a vapor chamber cooking device according to the invention is able to provide an essentially isothermal cooking surface substantially free from "hot spots" regardless of changes in thermal load.

Although the invention has been shown and described with reference to particular embodiments, nevertheless, various changes and modifications obvious to a person skilled in the art to which the invention pertains are deemed to lie within the purview of the invention.

What is claimed is:

1. A controlled vapor chamber cooking device having:
   a housing defining a sealed vapor chamber and having an extended top wall for providing a cooking surface;
   a capillary wick disposed along the bottom surface of said chamber;
   a plurality of internal structural support members disposed between said wick and the upper surface of said chamber and secured to said upper surface, said support members defining a plurality of vapor pressure equalization holes;
   a quantity of volatile working fluid disposed in said chamber sufficient to saturate said wick when in a liquid state;
   means for heating said chamber to vaporize working fluid contained therin;
   means responsive to the vapor pressure within said chamber for controlling said heating means to maintain said vapor pressure within a predetermined range; and
   means defining an auxiliary chamber having a volume equal to at least about twice the liquid volume of said working fluid in fluid communication with said vapor chamber, a valve disposed to selectively allow and preclude said fluid communication and pressure actuated means for controlling said valve to preclude said fluid communication under normal operating conditions and to allow said fluid communication upon the occurrence of said overpressure condition.

2. A controlled vapor chamber cooking device according to claim 1 wherein the volume of said auxiliary chamber is equal to at least about twice the liquid volume of said working fluid.

3. A controlled vapor chamber cooking device having:
   a housing defining a sealed vapor chamber and having an extended top wall for providing a cooking surface;
   a capillary wick disposed along the bottom surface of said chamber;
   a plurality of internal structural support members disposed between said wick and the upper surface of said chamber, and secured to said upper surface, said support members defining a plurality of vapor pressure equalization holes;
   a quantity of volatile working fluid disposed in said chamber sufficient to saturate said wick when in a liquid state;
   means for heating said chamber to vaporize working fluid contained therein;
   means responsive to the vapor pressure within said chamber for controlling said heating means to maintain said vapor pressure within a predetermined range; and
   means defining an auxiliary chamber adjacent to said vapor chamber and for providing a fluid passageway between said auxiliary chamber and said vapor chamber, and pressure sensitive rupturable means disposed in said passageway for normally precluding fluid communication between said vapor chamber and said auxiliary chamber and designed to rupture when the pressure differential between said chambers reaches said overpressure condition.

4. A controlled vapor chamber cooking device according to claim 3 wherein the volume of said auxiliary chamber is equal to at least about twice the liquid volume of said working fluid.

* * * * *